Oct. 19, 1965     L. D. YOKANA     3,212,134

EXTRUSION DIE ASSEMBLY

Filed July 6, 1961     2 Sheets-Sheet 1

INVENTOR
LUCIEN D. YOKANA
BY
Pennie, Edmonds, Morton, Barrows & Taylor
ATTORNEYS Oct. 19, 1965   L. D. YOKANA   3,212,134
EXTRUSION DIE ASSEMBLY Filed July 6, 1961   2 Sheets-Sheet 2

INVENTOR
LUCIEN D. YOKANA,

BY Pennie Edmonds, Morton Taylor
and Adams
ATTORNEYS

United States Patent Office 3,212,134
Patented Oct. 19, 1965

3,212,134
EXTRUSION DIE ASSEMBLY
Lucien D. Yokana, 3 Newlin Road, Princeton, N.J.
Filed July 6, 1961, Ser. No. 122,251
4 Claims. (Cl. 18—14)

This invention relates to extrusion die assemblies and more particularly to apparatus for preventing the formation of weld lines in products formed by die assemblies.

In the formation of extruded articles, plastic materials such as resins are mixed and normally heated in an extrusion machine and then discharged therefrom into a mold or die. Extruded articles presently manufactured may be classified as molded or die formed. Molded articles are usually formed by filling molds utilizing the discharge pressure of the extrusion machine. Die extruded articles are formed by the use of extrusion die assemblies by forcing the plastic materials through the die orifice of the assembly. This invention is directed to the improved formation of articles using extrusion die assemblies.

In the manufacture of die formed articles, the plastic material is discharged by screw or pump action from the barrel or other outlet of the extrusion machine into the die assembly. The die assembly which is normally mounted on the extrusion machine is positioned with and secured to the discharge outlet in a manner which utilizes the discharge pressure of the extruding machine to cause the plastic material to flow through the assembly and be discharged through the die orifice.

The cross-sectional configuration of a continuously extruded article depends on the shape of the die orifice. Die formed extruded objects may for the purposes of this disclosure be grouped depending on their cross-sectional configuration. One group includes die formed articles where the die assembly determines the article's outside or external dimensions only and where the assembly does not form any inside or internal dimensions. A cross-sectional view of such articles, for example, bars, strips, and sheets, shows no internal omissions of material. Another group includes die formed articles in which the die assembly determines not only the external dimensions of the article but also forms internal dimensions. The external dimensions of the die assembly orifice are determined by that part of the assembly herein called the die; the internal dimensions of the orifice are determined by that part of the assembly herein called the mandrel. Thus, articles of the latter group are produced by the die assemblies which include mandrels. Die assemblies which form articles of the second group are herein referred to as mandrel die assemblies. Examples of articles produced using such assemblies are tubes, pipes and rectangular ducts.

The present invention is directed to all die assemblies in which there is a division of flow of the main stream of material. Division of flow is herein characterized as the separation into two or more partial streams of material and their subsequent reunion. Since mandrel die assemblies generally require a division of flow around the mandrel mounting, this invention is particularly useful in mandrel die assemblies. Separation of main flow of the material stream may be required to permit the material to pass by the mandrel mounting, to effect more uniform delivery of material to the vicinity of the orifice or for other reasons depending on particular extrusion die assembly design.

Heretofore, many articles formed by mandrel extrusion die assemblies contained imperfections commonly known as weld lines. Weld lines are the lines formed by the joining or fusion of the partial streams of plastic material as they reunite after flowing in channels separated from the main or entrance stream. Weld lines cause undesirable dimensional imperfections and structural weaknesses in the extruded article. Plastic material enters the assembly in a single main stream and is then usually channeled into a plurality of partial streams. These partial streams reunite in the vicinity of the die orifice. It is these rejoining streams which form weld lines.

Heretofore, the plastic material streams have been reunited by the operating pressures in the die assembly. Fusion or welding of the partial streams depend on the heat, pressure, rate of flow and nature of the material. In the extrusion of some materials weld lines have not presented any practical problem. However, in commercial extrusion of many materials internal die assembly conditions including pressures and flow characteristics have been unable to effect suitable reunion of the material streams. Applicant has discovered a method and apparatus for effecting suitable reunion and thus eliminating weld lines.

Applicant has discovered a method for eliminating weld lines which includes throttling or restricting the flow of the partial material streams as and after they reunite in order to create mixing adequate to reunite the streams without the formation of weld lines. Applicant's apparatus for practicing his method includes in an extrusion die assembly a restriction member positioned in a chamber or cavity located between the reunion of the partial streams and the orifice. The restriction member is positioned to cause partial stream mixing adequate to eliminate weld lines. The restriction member may be of any suitable shape depending on the particular die assembly and the shape of the chamber in which the member is positioned. A ring-shaped member is suitable for die assemblies with circular dies and circular mandrels. In die assemblies with die orifices which are defined by rectangular or other non-circular shaped dies and mandrels, non ring-shaped restriction members may be employed. Such non-circular shaped restriction members are herein called restriction bars.

The chamber or cavity in which the member is positioned may be of any size and shape which permits a sufficient rate of flow of the material to the die orifice. Preferably, flow is uniformly restricted throughout the assembly; however, properly positioned partial restrictions in areas where weld lines usually form will often produce acceptable results. The flow pattern of plastic material through the die assembly depends on particular die assembly design; however, all assemblies which include mandrels have a common flow characteristic in that main stream which enters the die assembly from the extrusion machine outlet must divide or separate to permit the main stream to flow around the mandrel mounting. In many tubing dies the main stream is separated into as many as eight streams. These streams are reunited in the vicinity of the die orifice after having flowed past the mandrel mountings.

The mechanism of applicant's discovery is further disclosed by the following description of a preferred embodiment of the invention.

Referring to the drawings in which an advantageous embodiment of the invention is illustrated:

Figure 1:
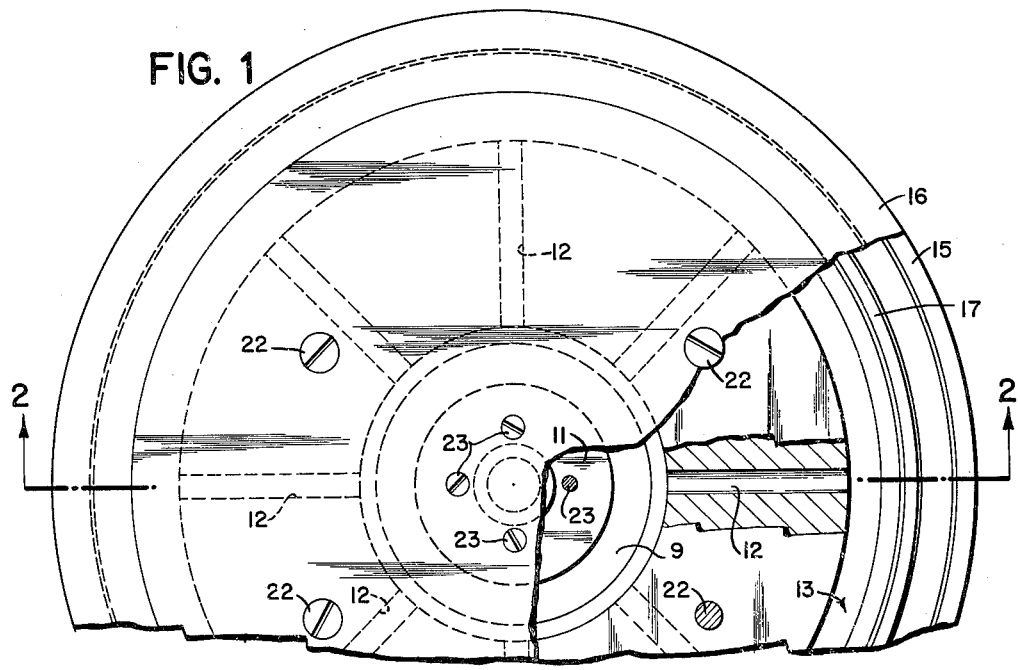
FIG. 1 is a partial plan view of an extrusion die assembly adapted to extrude plastic tubing, a portion of the mandrel being cut away.

Referring to the drawings in greater detail and in which like parts have the same identifying numeral, 1 is the extrusion machine barrel in which the plastic material is mixed and heated. The plasticized material is discharged through breaker plate 2 and screen 3 into adaptor 4. The plastic material then flows through adaptor channel 5 and into die assembly main channel 6. The die housing 7 is secured to adaptor 4 by means of nuts and bolts 8. As the material flows into die manifold 9, the thoroughly mixed material expands until the main or entrance stream has cross-sectional configuration 10. As the stream continues in its flow through the die assembly the configuration of main stream 10 is broken and the main stream configuration commences internal or inside dimensions caused by die cone 11. The main stream finally becomes doughnut-shaped and then flows from manifold 9 into radial channels 12. Partial streams pass through channels 12 and rejoin in mixing chamber 13. The reunited streams then flow from chamber 13 and are discharged through die orifice 14 forming article 14a. The outside diameter of die orifice 14 is determined by adjustable die 15. The inside diameter of orifice 14 is determined by mandrel 16.

The flow of material through mixing chamber 13 is varied by adjustable restriction ring 17. Mixing chamber 13 includes the entire volume or cavity between the die orifice 14 and the discharge ends of radial channels 12. In this particular embodiment of the invention, the mixing chamber is generally torodial or doughnut-shaped. It has been found that a restriction member in the shape of a ring provides good flow restriction characteristics in such a chamber. Restriction ring 17 may be raised or lowered by a plurality of suitably positioned push studs 18 and pull studs 19. Die 15 may be adjusted using screws 20 to vary orifice 14. Mandrel 16 is secured to die plate 21 by mandrel mounting cap screws 22. Die cone 11 is secured to mandrel 16 by cap screws 23. Die plate 21 is secured to die housing 7 through securing ring 24.

In the operation of the illustrated extrusion die assembly the flow and pressure of the material in mixing chamber 13 is regulated by adjusting restriction ring 17. Push studs 18 are inserted in holes passing through die plate 21 and die 15 and are threaded to engage the die and abut the under side of the ring. Push studs are rotated to raise the restriction ring 17 and to increase restriction of flow through chamber 13. Pull studs 19 also pass through the die plate and die and are threaded to engage the ring. Pull studs are lowered by turning the associated nut 19a to reduce the restriction of flow through chamber 13. Positioning of the restriction ring to prevent the formation of weld lines in the formed article depends on the material, temperature, rate of flow and so forth.

Figure 2:
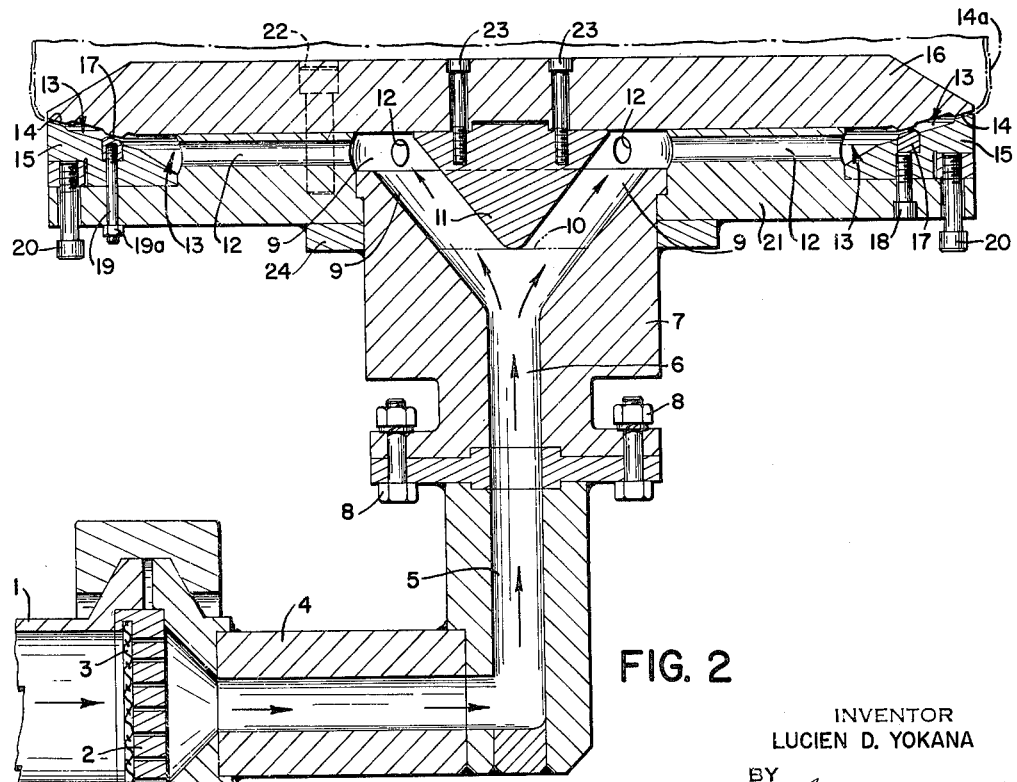
FIG. 2 is a sectional elevation view of the extrusion die assembly, adaptor and portion of extrusion machine barrel.
Figure 3:
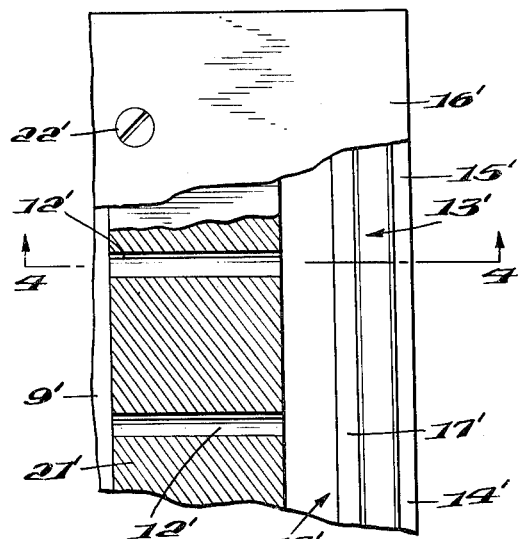
FIG. 3 is a partial plan view of a modification of the die assembly.
Figure 4:
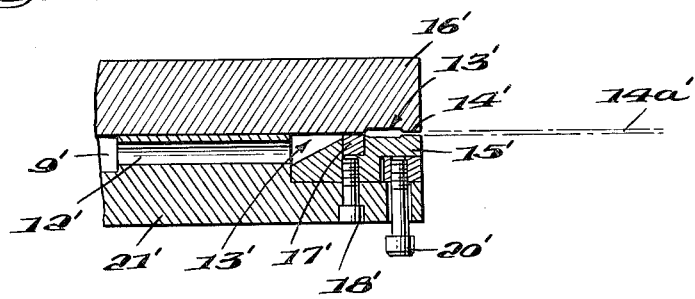
FIG. 4 is a circular elevation view of the modified form of the invention along lines 4—4 of FIG. 3.

FIGS. 3 and 4 show a modified illustration of the extrusion die assembly wherein the die orifice 14' is non-circular. In this embodiment, mandrel 16' is secured to the die plate 21 by mounting cap screws 22' in substantially the manner as described above with respect to FIGS. 1 and 2. Similarly channels 12, through which the streams pass, join with mixing chamber 13'. Restriction bar 17' is partially located within the mixing chamber 13'. The rate of flow of the stream in the mixing chamber 13' is controlled by the relative location of restriction bar 17'. Restriction bar 17' may be vertically adjusted by stud 18'.

The mixing chamber 13' communicates with non-circular die orifice 14'. The dimensions of die orifice 14' are controlled by adjustable die 15 which is positioned between mandrel 16' and die plate 21'. Die 15 may be vertically moved by screw 20 which ultimately determines the dimensions of product 14a'.

It is to be understood that the present invention is not limited to the foregoing embodiment. In addition, the present invention may be employed on extrusion die assemblies in which the die assembly is stationary or in which the die assembly is caused to rotate. In the extrusion of collapsible tubing which is taken up on rolls, die assemblies are sometimes caused to rotate during the extrusion process in order to prevent imperfection or "high spots" on the tubing from being repeatedly rolled up on the same portion of the take-up roll.

I claim:

1. An extrusion die assembly having a die orifice and a mixing chamber adjacent the die orifice for delivering plastic material thereto, the assembly also including a receiving passage for the main supply stream of material to the assembly and a plurality of flow passages interconnecting the receiving passage with the mixing chamber, such flow passages having appreciable length and being spaced from one another by appreciable distances so as to deliver a plurality of separate streams of plastic material to the mixing chamber, and means projecting into the mixing chamber for adjustably restricting the rate of flow of the plastic material therethrough from said plurality of flow passages to the die orifice thereby to eliminate weld lines from the molded article.

2. In an extrusion die assembly in which the main stream of plastic material is divided by flow passages of appreciable length and spaced apart appreciable distances from one another, the several streams being rejoined prior to the discharge through the die orifice, the improvement for eliminating weld lines comprising a chamber positioned adjacent to the die orifice arranged to receive the rejoined streams, and a restriction member projecting into said chamber, said member adjustable for varying the rate of flow of said material.

3. In an extrusion die assembly according to claim 2 in which the die orifice is determined by a circular die and a circular mandrel and in which the restriction member is ring-shaped.

4. In an extrusion die assembly according to claim 2 in which the die orifice is formed by non-circular die and non-circular mandrel and in which the restriction member is a restriction bar.

References Cited by the Examiner

UNITED STATES PATENTS

| | | |
|---|---|---|
| 2,607,078 | 8/52 | Grimes. |
| 2,626,427 | 1/53 | Brown. |
| 2,753,596 | 7/56 | Bailey. |
| 2,824,337 | 2/58 | Covington et al. |
| 2,897,541 | 8/59 | Orsini. |
| 2,978,748 | 4/61 | McCauley et al. |
| 3,026,565 | 3/62 | Bonner. |

FOREIGN PATENTS 1,072,378 12/59 Germany.

ROBERT F. WHITE, *Primary Examiner.*

MICHAEL V. BRINDISI, ALEXANDER H. BRODMERKEL, *Examiners.*